US011865834B2

(12) United States Patent
Vila Abad et al.

(10) Patent No.: US 11,865,834 B2
(45) Date of Patent: Jan. 9, 2024

(54) PRINTHEAD ALIGNMENT

(71) Applicant: HEWLETT-PACKARD DEVELOPMENT COMPANY, L.P., Spring, TX (US)

(72) Inventors: Maria Vila Abad, Sant Cugat del Valles (ES); Xavier Quintero Ruiz, Sant Cugat del Valles (ES); David Vendrell Tornero, Sant Cugat del Valles (ES); Carles Carmona Calpe, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 255 days.

(21) Appl. No.: 17/411,408

(22) Filed: Aug. 25, 2021

(65) Prior Publication Data
US 2023/0062837 A1 Mar. 2, 2023

(51) Int. Cl.
*B41J 2/045* (2006.01)
*G06F 3/12* (2006.01)

(52) U.S. Cl.
CPC ....... *B41J 2/04505* (2013.01); *B41J 2/04536* (2013.01); *B41J 2/04586* (2013.01); *G06F 3/1211* (2013.01); *G06F 3/1229* (2013.01); *G06F 3/1256* (2013.01)

(58) Field of Classification Search
CPC ............... B41J 2/04505; B41J 2/04536; B41J 2/04586; B41J 2/2135; B41J 2/2146; B41J 2/2132; B41J 19/145; B41J 25/001; B41J 2/04503; G06F 3/1211; G06F 3/1229; G06F 3/1256
See application file for complete search history.

(56) References Cited

U.S. PATENT DOCUMENTS

| 6,234,602 B1* | 5/2001 | Soto ....................... B41J 29/393 347/19 |
| 2003/0058294 A1* | 3/2003 | Butterfield ............. B41J 29/393 347/19 |
| 2005/0285889 A1* | 12/2005 | McGarry ................ B41J 2/2135 347/19 |
| 2007/0008361 A1* | 1/2007 | Kawatoko .............. B41J 2/2135 347/12 |

\* cited by examiner

*Primary Examiner* — Kristal Feggins

(57) ABSTRACT

Examples relate to computer-implemented methods for a printing system comprising a printhead, and to printing systems. A method for a printing system comprises retrieving a stored first offset applied to the printhead to align the printhead, the first offset determined based on a first user input signal; and further aligning the printhead according to a further offset determined based on a further user input signal, the further offset indicating a difference from the first offset.

15 Claims, 4 Drawing Sheets

PRINTHEAD ALIGNMENT

BACKGROUND

Printing may be performed by applying printing fluid to a print medium via a printhead. It may be desirable to be able to achieve a high print quality, for example through accurate placement of printing fluid from print nozzles of the printhead onto print media.

BRIEF INTRODUCTION OF THE DRAWINGS

Example implementations are described below with reference to the accompanying drawings, in which.

DETAILED DESCRIPTION

Figure 1:
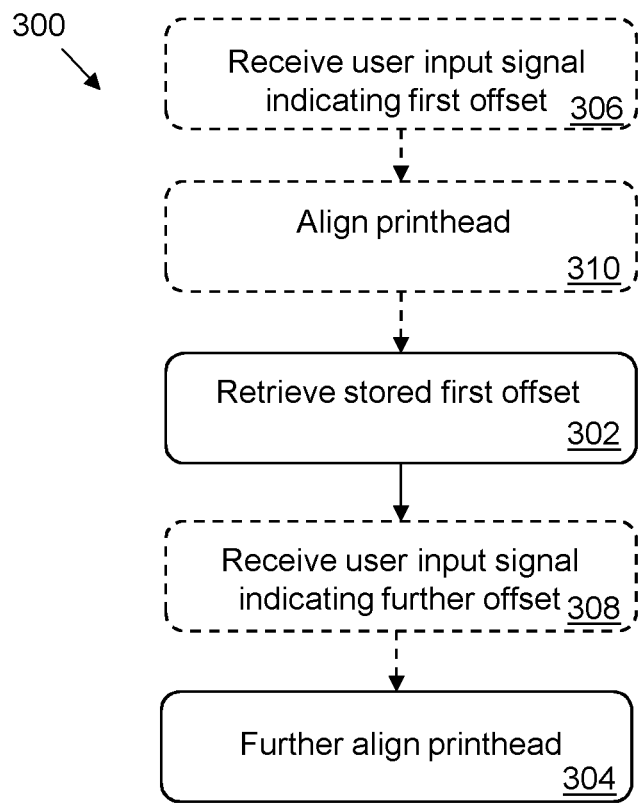
FIG. 1 depicts an alignment process according to examples of the present disclosure.

Some printing systems form a printed image by ejecting printing fluids from nozzles of a printhead. The printhead may comprise one or more nozzles, each providing a respective colour of printing fluid. Each nozzle is supplied with printing fluid from a corresponding printing fluid cartridge or reservoir (e.g. black, cyan, magenta, yellow). A "nozzle", or printing fluid outlet or aperture, is a hole through which the printing fluid is emitted during printing. A printhead has plural nozzles, and each nozzle may form part of a subset of a printhead such as a die or portion of a die (a die may be considered to be a portion of a printhead), a trench or portion of a trench (a trench may be considered to be a portion of a die), or a portion of a printhead, depending on the arrangement of the printhead. Thus printing fluid is applied onto a print medium in a series of individual dots positioned at specific locations through the nozzles. The printhead may physically scan across a print medium (for example, transverse to the direction of movement of the print medium through the printing system) to deposit bands of printing fluid from the printing fluid cartridges/reservoirs via the respective nozzles. As the print medium is moved through the printing system, an image is printed on the print medium surface.

It is desirable for the printheads to be correctly aligned with respect to the print medium. Misalignment from an ideal correct position may arise due to, for example, variations in manufacturing tolerance, positioning of the printhead in the carriage, and/or thermal variations. If a printhead is misaligned, the individual dots might not be printed at the desired locations. For example, printhead misalignment in bidirectional printing, whereby printing fluids are ejected while the printhead is travelling in a forward and a reverse direction, may result in a mismatch between dots printed in the forward direction and dots printed in the reverse direction, to the detriment of the overall print quality achieved (e.g. the image may appear blurry or faint in places).

A Manual Printhead Alignment (MPA) process is based on printing an MPA plot which shows default printhead alignment values for all printheads. The user can check the continuity of diagnostic lines on the plot. In each set of patterns, printhead misalignment is visible as a step, or discontinuity, in the line at its centre. To perform printhead alignment, the user can choose which option of the possible alignments gives the best continuity (where both halves of a test line are the best aligned when they appear as a single line).

Then, all the printheads which deviate from the default (initial) printhead alignment are re-aligned according to user inputs indicating desired offsets to apply. Each time an alignment is performed, all printheads are aligned from scratch (from an initial, default, position). Often, this is not desirable because not all the printheads need re-aligning; sometimes one printhead may need to be re-aligned (for example when a single printhead has been replaced) but the other printheads may already be aligned. However, in the current MPA alignment strategy, all the printheads are re-aligned at each pass of the MPA. MPA plots can be a sizeable and slow to print. This alignment method can also result in a "correct" alignment for a particular medium but may not be the most accurate correction for another medium (e.g. due to print medium tension or wrinkles, for example).

Furthermore, once the manual alignment has taken place for all printheads, a verification plot may then be printed showing the current set alignment. The verification plot allows a user to check the correctness of the current alignment, but cannot be used to align the printer. After generating the verification plot, if the alignment is still not correct, then the process needs to be all performed again from the start.

When the printer needs to be re-aligned, the user performs the described procedure as if the printer was new. This alignment strategy does not make use of any previous alignments, because the MPA plot always starts from scratch and the user needs to check the values on the alignment patterns for every printhead, as it is not immediately obvious on the plot itself if the last selected value is still the correct one.

Disclosed herein are printhead alignment strategies that allow for faster alignment that consumes less media than traditional printhead alignment methods. Examples are based on an iterative alignment strategy that uses one type of alignment plot to both check and correct the alignment. This plot is printed using the last-used alignment values, thereby allowing for easy identification and alignment of the printheads which need an adjustment, and the adjustment which may be made to align them. Examples disclosed herein aim to reduce the amount of content which is printed in an alignment plot each time a printhead alignment takes place. An alignment plot may be printed according to examples disclosed herein which is smaller than an MPA plot, and which is more similar in appearance and size to a verification plot in that the amount of alignment information shown in much less than an MPA plot. However, alignment plots disclosed herein also provide an indication of the current alignment, as well as a range of possible alignment offsets which can be applied, in a similar way to the MPA plot. This is unlike a verification plot from which there is no value indication to input to the printing system to perform an alignment. Therefore, by using the last known corrections to print a simpler alignment plot which allows a user to quickly decide if a pattern is aligned or not, and directly modify the corresponding values if need be, the alignment process is simplified and a user can skip alignment of printheads which are already aligned.

FIG. 1 illustrates an example method 300 for a printing system comprising a printhead. The method 300 comprises retrieving a stored first offset 302. The stored first offset has been applied to the printhead to align the printhead. The first offset is determined based on a first user input signal. Thus the method 300 in some examples may comprise receiving a user input signal 306 indicating a first offset to apply to the printhead to align the printhead 310, and may comprise aligning the printhead 310 according to the first offset. The user input signal may be, for example, based on a user's inspection of a verification-type plot showing a current printhead position compared with an aligned printhead position. The current printhead position before any user inputs are received to change the alignment of the printhead may be considered to be a factory setting zero value, or a default value before any user offset is applied. The difference between the aligned position (i.e. the ideal position) and the current position corresponds to the offset to be applied in order to align the printhead.

The method 300 comprises further aligning the printhead according to a further offset 304. The further offset is determined based on a further user input signal and indicates a difference from the first offset. The method 300 may thus comprise receiving a further user input signal 308 indicating a further offset to apply to the printhead to align the printhead. Using a further offset which corresponds to a difference from a first offset is different to other methods which do not account for the current position which may have an offset applied already. Instead such methods may accept an offset from an initial (scratch) position each time, such that the same alignment process is just performed a second time in the same way as a first alignment process. There may be more than one further offset in some example methods 300, in which case the most recent further offset indicates a difference from the immediately preceding position of the printhead (i.e. the latest offset applied is an offset based on the preceding overall offset applied). Thus, the alignment process 300 here is iterative in that a previous alignment setting is retrieved 302 for use in a further alignment 304.

Applying an offset to apply to the printhead to align the printhead should be understood to encompass applying an offset to apply to a portion of the printhead (e.g. to apply to a nozzle group, die, or trench) such that the offset to apply to that portion may be extrapolated to apply to the whole printhead, on the basis that any differences within the printhead between one nozzle group, die, or trench of the printhead and another nozzle group, die, or trench of the same printhead would be negligible. To align a printhead (of which there may be one, or more than one, in a printing system), then an offset may be applied to the printhead based on a correction determined from at least a part of the printhead. A printhead comprises a plurality of nozzles which may be considered to be arranged into groups. For example, a printhead may comprise one or more die/dice (e.g. five dice), each of which comprises a plurality of nozzles. Each dice may comprise one or more trenches (e.g. one, two, four trenches per die). Each trench of a die comprises a set of nozzles (e.g. 1056 nozzles per die). Each trench of a die may provide the same coloured printing fluid in some examples, but in other examples each trench of a die may provide a different coloured printing fluid. For example, there may be two differently coloured printing fluid channels connected to a die comprising two trenches, or there may be one colour of printing fluid channel connected to both trenches of a two-trench die. It may be that by aligning a trench (or die, or nozzle group), this is sufficient as a sample of the printhead to align the whole printhead, because the difference in alignment between one nozzle group and another nozzle group of the same printhead may be negligible. Based on the alignment of a trench, die, or nozzle group, each of which forms part of the printhead, the alignment offset determined for that trench, die, or nozzle group may be applied to the whole printhead to align the printhead.

Figure 2:
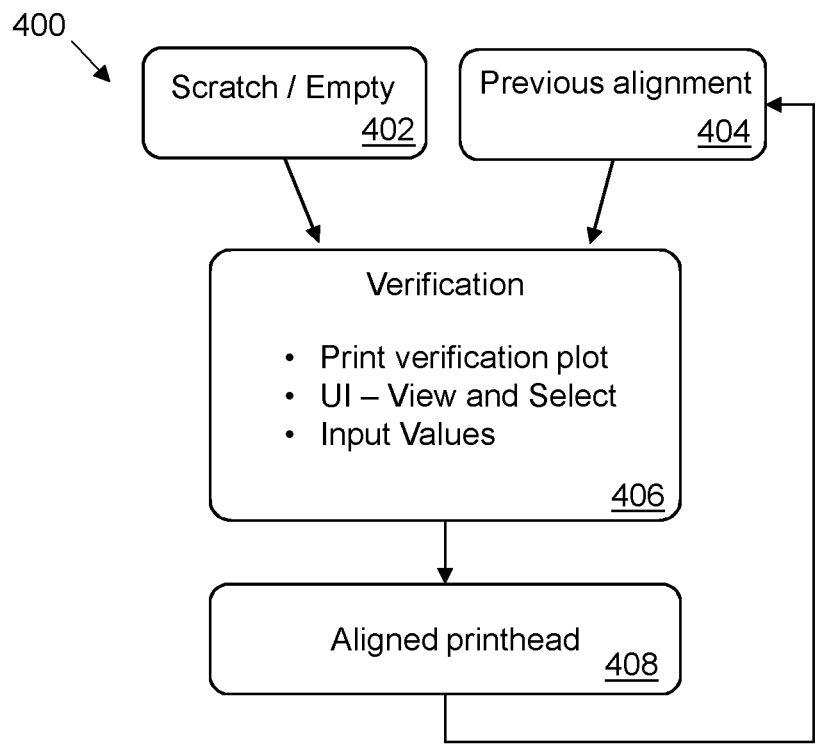
FIG. 2 depicts an alignment process according to examples of the present disclosure.

FIG. 2 illustrates an example method of printhead alignment. At the start of the process 400, each printhead is at an "empty" offset 402, i.e. a default scratch position with no offset applied. In this example, the method 400 comprises providing a verification plot 406. The verification plot here indicates a difference (a misalignment) between a current position of the printhead and an aligned position (i.e. an ideal position) of the printhead, as well as an indication of possible offsets which may be applied to correct any misalignment.

While the term "verification plot" is used, the plot may be alternative labelled as an "alignment plot", "offset plot", "modified verification plot" or other suitable label to indicate that the plot both shows the current alignment and possible offsets which may be applied to adjust that current alignment. By printing the current position of the printheads compared with an aligned position, as well as possible offsets which may be applied to correct a misalignment between the current position and the aligned position, in the same verification-type plot, improved consistency and accuracy may be obtained in comparison to a process which separately generates plots to show the current positions, and to show possible offsets to apply to correct any misalignment, because some change may occur between printing the two plots which causes a correction to be less effective (e.g. thermal drift).

In a first iteration, the current position of the printhead will be the scratch position with no offset applied 402. A user input signal may be received indicating a first offset according to a generated verification plot 406. A first alignment is then made according to the first offset and the first offset is stored for future use. That is, the first offset may be determined based on the first user input signal provided to perform a first printhead alignment operation; and the determined first offset may be stored for future use. A further user input signal may then be received indicating a further offset (further to the stored first offset) to apply to the printhead after an initial alignment. The further user input signal may indicate the further offset to be applied according to a further verification plot 406 generated after the first alignment. The further offset is to be applied in combination with any existing applied (e.g. first) offset which has been stored.

After receiving a user input signal to offset the printhead based on an alignment plot 406, the printhead is aligned 408 according to the input offset. The process of alignment may be repeated, and further verification plots 406 may be generated, based on the current position of the printhead (with a current offset applied) rather than the default initial alignment 402. The method 400 may be said to comprise providing a verification plot 406 indicating a difference between a current position of the printhead and an aligned position of the printhead, wherein the further offset corresponds to an offset indicated in the verification plot. After receiving a user input signal to align the printhead 408, a further verification plot 406 may be provided indicating a difference between a current position of the printhead following alignment of the printhead according to the preceding offset (i.e. based on the previous alignment 404), and an aligned position of the printhead.

Thus, based on a previous alignment 404, another verification plot may be generated 406, as a check to see if the alignment is correct and if any further fine tuning of the alignment may be made or is desired. If a printhead already appears aligned from the verification plot 406, then no further offset needs to be applied to that printhead. If there are plural printheads, then those which are already aligned need not be re-aligned (in other words, a further offset of "zero" is applied to those because the previous offset which was applied was sufficient to align them and that previous offset value is retained). This saves time and printing resources by not needing to check printheads which are already aligned, and those which are to be further aligned can be checked and adjusted rather than all the printheads being re-aligned.

Figure 3:
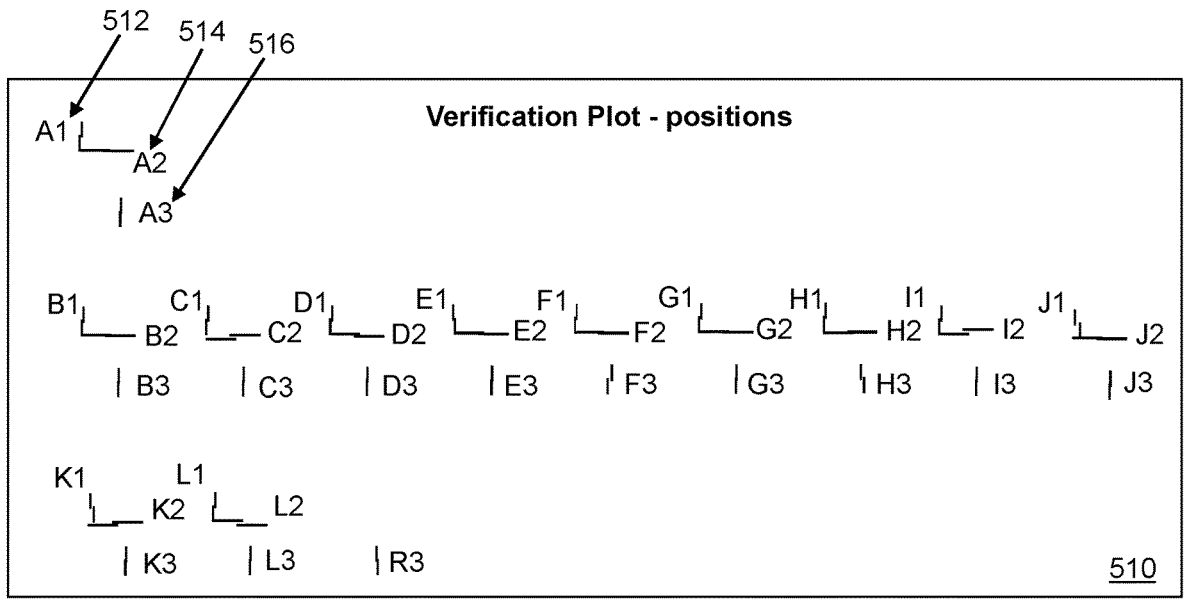
FIG. 3 shows a verification plot according to examples of the present disclosure.
Figure 3:
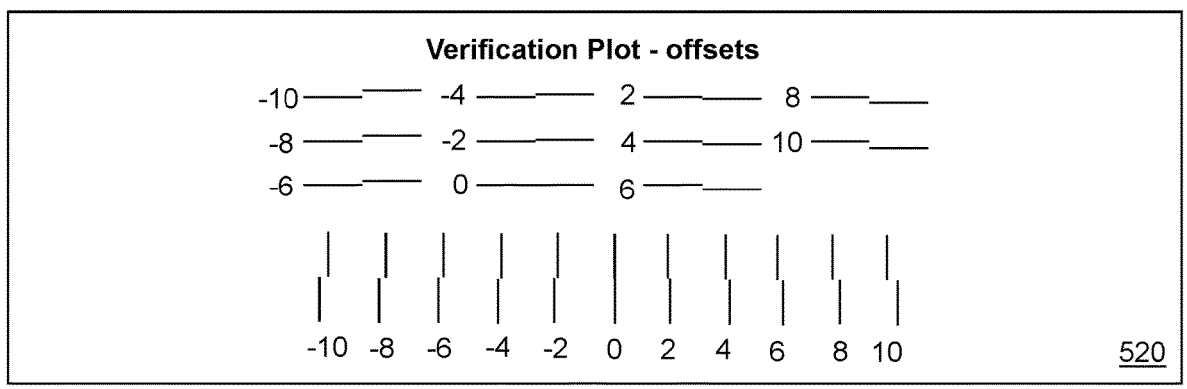
Figure 3:
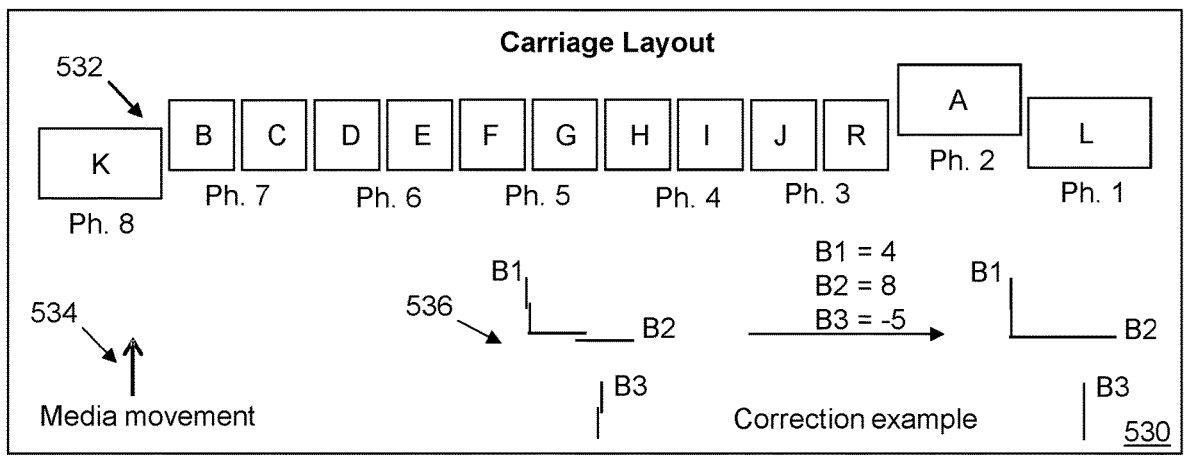

FIG. 3 illustrates an example of a verification plot which may be used, for example in the methods 300, 400 of FIGS. 1 and 2. This example verification plot comprises three portions. A "positions" portion 510 indicates the current position of nozzle groups A to L compared to the aligned position. In this example each nozzle group represents a trench of the printhead. Generally, each nozzle group may be the group of nozzles forming a trench (or subset of a trench) of the printhead, or a die (or subset of a die) of the printhead, in some examples. Each trench (nozzle group) A-L may be aligned individually. An "offsets" portion 520 indicates a plurality of possible offset values, from which the user can select an offset value to apply to a nozzle group A to L to improve its alignment and move it to an aligned position. This example illustrates offset amounts in the horizontal and vertical line directions. A "carriage layout" portion 530 provides general information to a user. The "carriage layout" portion 530 may be optional and provides some overview information for the user but this may not be generated and printed in some examples.

This example verification plot 500 is generated for a printing system comprising a plurality of printheads 1 to 8, wherein each printhead provides either one or two printing fluid colours. In other examples there may be a different number of printheads, such as printing systems using one printhead, or a different number plurality of printheads. In other examples each printhead may comprise one, or more than one, die. Each die may comprise one, or more than one, trench. A die, or a trench, may each be considered to be an outlet formed by a plurality of outlets (nozzles, working together) to dispense printing fluid. A trench may be considered to be a plurality of nozzles arranged physically so that the nozzles are precisely mechanically arranged, and may be addressed individually in order to fire them if needed to emit printing fluid. One printing fluid cartridge colour (e.g. black, cyan, magenta, yellow) may be connected to one printhead for dispensing printing fluid from that cartridge onto a print medium. Each printhead may comprise one die, or more than one dice, and each die/dice may comprise one, or more than one trenches. Each trench may comprise a plurality of individual nozzles. The printhead may be connected to one printing fluid cartridge, or a plurality of printing fluid cartridges (e.g. one printhead may provide two, or four, printing fluid colours). Each printhead which comprises more than one trench supplying the same colour of printing fluid may have each of those trenches connected by an ink channel to the same cartridge. Each printhead may not necessarily be a separate, physically different, printhead in some examples. That is, each printhead may comprise two different printing fluid channels, one per trench line. On one or more of the printheads, the printing fluid channels may be connected to the same printing fluid cartridge.

In this specific example, there are eight printheads 1-8, each of which comprises five dice, with each die comprising two trenches, and each trench comprising 1056 nozzles. Five of those printheads (3-7) have different printing fluid colorants per trench, and three of them (1, 2 and 8) have the same printing fluid colorants on both trenches (respectively, A, K and L). Those with the same printing fluid colorants on both trenches are illustrates as being wider, to represent both trenches having the same colorant. The alignment plot 510 for this example shows 12 pattern sets plus a bi-directional reference R3, because the printheads 1, 2 and 8 which have the same colorants on both trenches are aligned on one of those trenches, and the results are cloned to the other of the two trenches, because it is assumed that variations between trenches using same colorant in the same die are negligible. If both trenches of the same-colourant printhead were aligned, there would be three more pattern sets in the alignment plot 510.

This example applies to scan axis printing in which a printhead raster scans across a print medium and after a band or swash of the image is printed, the print medium advances through the printing system, perpendicularly to the scan movement of the printhead, for a subsequent band/swash to be printed. The "positions" 510 portion indicates three alignment directions 1 to 3 512, 514, 516, for each printhead nozzle A to L ("R" is a reference printhead and is aligned in the bi-directional offset). Thus the alignments which may be made, in this example, are in one or more of three possible directions. In other examples there may be more, or fewer, possible alignment directions in which alignments may be made (in other words, there may be different types of offset which may be applied to align each nozzle group (e.g. to align each trench, die, or printhead). The alignment direction 1 in which a first offset type may be applied 512 corresponds to a difference between a current scan axis position of the printhead nozzle and an aligned scan axis position of the printhead nozzle. The alignment direction 2 in which a second offset type may be applied 514 corresponds to a difference between a current print medium axis position of the printhead and an aligned print medium axis position of the printhead. The alignment direction 3 in which a third offset type may be applied 516 corresponds to a difference between a bidirectional scan axis position of the printhead and an aligned bidirectional scan axis position of the printhead. In a page wide array (PWA) printing system, in which the printhead remains stationary and the print medium moves through the printing system, the "scan axis" may be understood to be a "cross-pen axis", and the "print medium axis" may be understood to be a "pen axis". In either a scan axis printing system or a PWA printing system, with respect to the printhead point of view, alignment direction 1 is a correction parallel to the movement of the print medium (i.e. along a "parallel correction axis") and alignment direction 2 is a correction perpendicular to the movement of the print medium (i.e. along a "perpendicular correction axis"). There is no equivalent of alignment direction 3 in a PWA printer as a PWA printer does not perform bidirectional printing—the print medium moves past the printhead in one, forwards, direction only.

In some examples, the "offsets" 520 portion may be printed as part of the verification plot on the first alignment iteration, but not necessarily on a later iteration of that alignment process. The error legend 520 may be printed with nozzles of the same nozzle group (e.g. the same trench, or same die) of the same printhead printing in a forward, but not in the reverse, direction; therefore the error legend 520 is not affected by any applied offset/correction. This information is a "key" to indicate offset sizes/directions, and the information displayed is not specific that a particular alignment instance (i.e. it does not show actual print positions) and therefore need not be provided multiple times. In some examples the error legend 520 may be provided on screen rather than printed, or may be provided as a reference in a physical medium such as a user manual. In other examples, it may be useful for the user to see a verification plot showing both the positions 510 and offsets 520 portions for ease of reference on each iteration of the alignment process, and to account for parameters (e.g. temperature, nozzle health) affecting alignment at that particular time of printing. The size of the error legend 520 may be relatively small compared to the total amount of printed media used to perform the alignment and thus printing the error legend 520 on each alignment round may not be overly onerous. Whether the legend 520 is printed at each iteration or not may be decided dependent upon, for example, reducing user error of setting offsets, storing the plot, when and where the plot of checked, and/or other factor(s).

In processes which perform a manual print alignment (MPA) process there are often many more possible offsets presented to a user and the verification plot of FIG. 3 shows fewer possibilities (11 in this case). Fewer possible offsets are sufficient to provide in these examples because the offset is a difference from the last used offset rather than a total overall offset value as indicated in the MPA plot (i.e. the offsets presented allow for an iterative shift from a current position rather than a total offset amount from a default starting value). Because the user chooses an alignment offset from fewer values, it may be easier for the user to select an appropriate offset when there are fewer choices, and less content need be printed than if more offset choices are presented.

In this example, the "carriage layout" portion 530 displays information regarding the layout 532 of the printheads 1 to 8 (indicated as Ph. 1 to Ph. 8, in which Ph. 1 has printhead L, Ph. 2 has printhead A, Ph. 3 has "logical printheads" J and R, since it is physically one printhead but logically (electronically) they are managed as two printheads, such that pattern sets J and R may be printed by printhead 3 each generated by different colourant printing fluids, etc.), an indication of the media movement 534 in the printing system, and an example correction 536 which may be applied to align a printhead. The "carriage layout" portion 506 of the verification plot may comprise fewer or more items of information to aid the use with the printhead alignment process. The "carriage layout" portion 506 also may be printed as part of the verification plot on the first alignment iteration but not on a later iteration of that alignment process because this information is not specific that a particular alignment instance (i.e. it does not show actual print positions) and therefore need not be provided multiple times. In some examples, the "carriage layout" information 530 may not even be printed for reference, but for example may be displayed on a display screen (which may be part of the printing system or may be remote from the printing system). In examples where the carriage layout information 530 is displayed rather than a hard copy of the carriage layout information being printed, real-time or variable information may be provided on the plot, such as the last date of replacement of a printing fluid cartridge/reservoir of each printhead, information about a previous alignment process and/or offset values used in a previous alignment (e.g. "at the last alignment, on date [date here], you had the following conditions: [alignment details and/or offsets here]"), the current ambient temperature, the current temperature at the printhead(s), the type of print media currently loaded, or any other information which may be of interest to the user.

Therefore, the user can print a verification plot 500, and match up each positional offset from the positions portion 510 with a matching offset from the offsets portion 520 and enter the offset value which best matches the actual positional offset to perform a printhead alignment. This is different to a manual print alignment (MPA) plot in which a full series of offset values for each printhead and each alignment direction is provided and the user selects the number corresponding to the best aligned line pair for each printhead and each alignment direction. Examples such as that shown in FIG. 3 (e.g. if portions 510 and 520 are printed) print much less content than a traditional MPA plot.

When following the process of FIG. 1 or FIG. 2, for example, the method 300, 400 may provide an available range of offset values within upper and lower offset value bounds. The user input signal may thus indicate the first offset within the available range. For example, on a first iteration of the alignment process, the user may be able to enter an offset of between absolute values of −10 and +10. The method may then comprise, following application of an offset value, in a subsequent iteration of the alignment process, providing a further available range of offset values within the upper and lower offset value bounds (between the same absolute values of −10 and +10). The further available range of offset values is adjusted according to the preceding offset. The further user input signal may then indicate the further offset within the further available range.

For example, on a first iteration, the user chooses to enter an offset of −5 for a particular printhead, which is between the absolute offset value bounds of −10 and +10. Then, on the second iteration, because the offset of −5 is already applied to the printhead, the user may be able to enter an offset value of an available offset range of between −5 and +15. The available offset range is adjusted according to the already-applied offset. In this way, the user cannot enter offset values which are very wrong (deviate significantly from a default central position and tend towards an offset limit) such that a correct alignment would be very difficult to achieve, because the method provides a range of offsets to select from which is kept within a sensible offset range (of e.g. −10 to +10). The offset range may be determined, for example, by hard offset limits which are physically possible to operate at, in some examples including a soft limit within those hard offset limits to help avoid operating at the physically possible extremes of the offset range. The range of available offsets may be provided in various ways. For example, if the offsets portion 520 of the verification plot is provided at each alignment iteration, those values which are allowed to be selected within the offset value bounds may be presented for selection. As another example, if the user inputs the selected offset value via a user interface, the user interface may accept offset values within the allowable offset range accounting for any previous alignment iterations.

Figure 4:
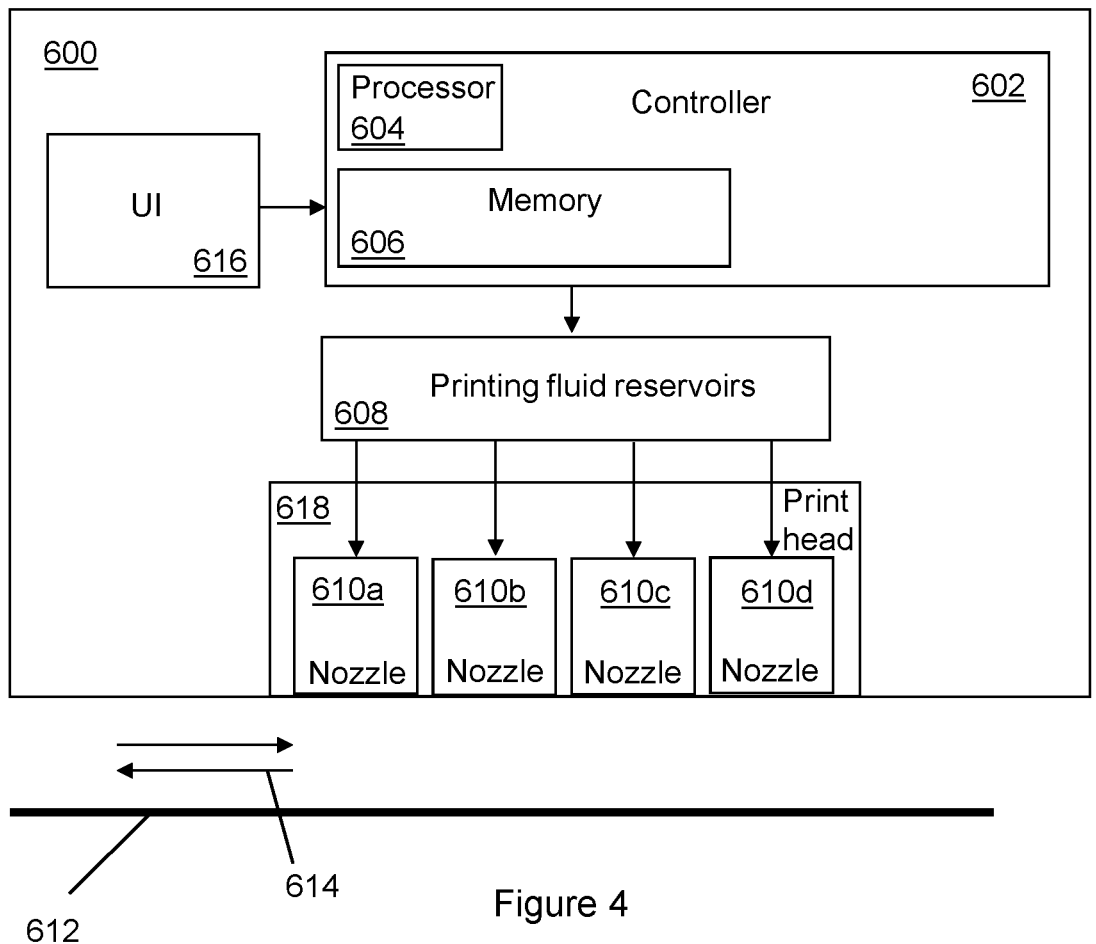
FIG. 4 illustrates a printing system according to examples of the present disclosure.

FIG. 4 illustrates an example printing system 600. The printing system 600 comprises a printhead 618 comprising a plurality of nozzle groups 610*a-d*; and a controller 602. Each nozzle group may be, for example, a trench, a die, or some other subset of the total number of nozzles of the printhead. Each nozzle group comprises a plurality of individual nozzles. Each of the nozzle groups 610*a-d* in this example can dispense printing fluid of one colour obtained from a printing fluid reservoir 608 onto a print medium 612, and forms part of a plural-colour printhead 618. In other examples there may more or fewer printheads than schematically illustrated here. The controller comprises a processor 604 and a memory 606. The controller 602 (or a different controller) of the printing system 600 may control the movement of the printhead back and forth 614 across the print medium 612 in a scan direction to dispense printing fluid on the print medium 612 to print an image.

The controller 602 is to cause the printhead 618 to generate a verification plot such as that illustrated in FIG. 3. That is, the verification plot displays respective differences between a current position of each nozzle group 610*a-d* and an aligned position of each nozzle group 610*a-d*; and an indication of an offset to be applied to change the current position of each nozzle group 610*a-d* to the aligned position of each nozzle group 610*a-d*.

The current position of a nozzle group may be understood to be where the nozzle group is at that point in the alignment procedure, and may be a factory default setting (if no offsets have been applied), may be a partly aligned position (whereby an offset has been applied to correct the position but further corrective improvement may still be made in a further iteration), or may be an aligned position (whereby the nozzle group position is, or is close enough within an acceptable accuracy level, the ideal aligned position of the nozzle group). The aligned position of a nozzle group may be understood to be the ideal aligned position being aimed for by performing the alignment process.

The controller 602 is to receive an input signal (for example, via a user input made to a UI 616) indicating an offset to apply to each nozzle group 610*a-d*. In some examples, it is each individual nozzle in the nozzle group which is addressed to have an offset applied, for example, to adjust the timing of printing fluid release from each nozzle. The input signal may be based on a printed verification plot. The controller 602 is to apply the indicated offset to each nozzle group 610*a-d* according to the input signal to position each nozzle group 610*a-d* at a corrected position. The corrected position of a nozzle group may be understood to be the position once an offset has been applied, which will be (or be very close to) the aligned position once the alignment process is successfully finished.

The controller 602 may then cause the printhead 618 to generate a further verification plot. The further verification plot displays respective differences between the corrected position of each nozzle group 610*a-d* and the aligned position of each nozzle group 610*a-d*; and an indication of an offset to be applied to change the corrected position of each nozzle group 610*a-d* to the aligned position of each nozzle group 610*a-d*.

The verification plot and the further verification plot may each display an indication of a plurality of possible offsets as shown in FIG. 3, portion 520. The controller 602 may receive the input signal indicating a selection of the offset to be applied to each nozzle group wherein the offset has been selected from the plurality of possible offsets. The controller 602 may then apply the selected indicated offset to each nozzle group 610*a-d* according to the input signal to move each nozzle group to the corrected position. The nozzle group may be a trench, a die, or a subset of a trench, a die, or the printhead. It may be desirable in some examples to be able to address a group of nozzles which is smaller than a pre-grouped nozzle group (e.g. smaller than a trench). A user may want to address an alignment defect, for example if the printhead is tilted in some axis, by having different possible alignment corrections which may be applied to one or more groups of nozzles inside the same pre-grouped nozzle group (i.e. a subset of nozzles within a trench, die, or printhead).

The offsets may be input by a user, for example to a user interface, UI 616. The user does not need to see, or select, what an individual nozzle prints. The alignment is performed based on the alignment of a group of nozzles (e.g. a subset of a trench, a subset of a die, a trench, a die) and the offset for that aligned group of nozzles is extended to correct a bigger nozzle group (i.e. the complete printhead). In this example the UI may be an integrated part of the printing system 600, comprising a touch screen, touch pad, keyboard, display screen, mouse, trackball, directional keys, or other suitable input device or devices. In other examples the UI 616 may be provided by an input device which is remote from and in electronic communication with the printing system (e.g. a computing terminal wiredly connected to the printing system, or a device such as a remote terminal, portable device, mobile communications device, or input panel, in wireless communication with the printing system). In examples where the UI 616 is remote from the printing system 602, the UI 616 and the printing system 602 may each comprise a communications module to provide for electronic communication between them (e.g. comprising a transceiver).

The printing system 600 may thus comprise a user interface module 616 (which may be a UI device at the printing system, or a module to receive input from a remote UI as discussed above) to receive a user input indicating the offset to be applied from a range of possible offsets, and provide the input signal to the controller 602 based on the user input. The range of possible offsets may be determined based on the current position of each nozzle group and a range of allowable offsets. As discussed above, the printing system 600 may determine the possible offsets which may be applied to each nozzle group 610*a-d* while retaining the nozzle group position within upper and lower offset bounds.

The printing system 600 comprises a memory 608 which may store an applied offset for a nozzle group based on receipt of the input signal indicating the offset to apply to the nozzle group. The memory may do this for each offset entered (and/or for each nozzle group). When a further verification plot is generated, it may then be generated using the stored offset applied to each nozzle group by retrieving the stored offset values from the memory 606. The further verification plot displays the respective differences between the corrected position of each nozzle group 610*a-d* and the aligned position of each nozzle group 610*a-d*, wherein the corrected position of each nozzle group 610*a-d* is determined according to the stored offset applied to that nozzle group as retrieved from the memory 606. Thus, by storing the applied offset(s) in the memory 606, verification plots may be generated using the last applied offsets.

The controller 602 in some examples may apply the indicated offset to each nozzle group 610*a-d* by determining a time delay to apply to each nozzle group 610*a-d* of the printhead 618 to cause each nozzle group 610*a-d* to release printing fluid at a time corresponding to the indicated offset for that nozzle group 610*a-d*. The offset to be applied may be entered, for example by user input, as an available offset value on a scale of between −20 to +20. The controller 602 may convert the entered offset value to a time delay (or time advance) to apply to the nozzle group, so that nozzle group then "fires" (releases printing fluid) at an offset time compared to a default firing time (e.g. a factory default firing time). Thus the adjusted position of the nozzle group may be considered to be an adjusted time position of the release of printing fluid from that nozzle group. In other examples, the adjusted position of a nozzle group may correspond to a physically offset position, for example, shifted forward or backwards from a default central position, to offset the print alignment for that nozzle group. A time delay may be applied in printing systems which are "scan axis" printers as schematically shown in FIG. 4, in which a carriage moves 614 over the media 612, prints something, then the media 612 advances, and the carriage goes back 614 to print something else, and this process is repeated to gradually print the image.

The controller 602 in some examples may apply the indicated offset to each nozzle group 610a-d by determining a positional shift to apply to the nozzle group to cause the nozzle group to move position into a nozzle buffer region of available nozzles located adjacent to the nozzle group. A positional shift may be applied in a page wide array (PWA) printer, in which the carriage is stationary above the media, and all printheads are aligned in one or more rows and the media moves continuously below the printhead. In examples in which printhead alignment is performed in a PWA printing system, rather than a scan axis alignment direction (i.e. a cross-media advance direction of printhead raster motion in a scan axis printer), there is instead a pen axis alignment direction. In a PWA printer also, rather than a print medium axis there is a cross-pen axis direction which is parallel to the media advance/paper axis direction.

Individual nozzle correction may be performed in the scan axis direction in a scan-axis printer, equivalent to the pen axis direction of a PWA printer. This may be done in the forward and reverse directions in a scan axis printer. This may be done in the forward direction in a PWA printer but not the reverse direction, as a PWA printer does not print in a reverse direction (such that the media moves back through the printing system). Such corrections may be performed by applying an offset as a time offset to delay or advance printing fluid release. While individual nozzles may be addressed, alignment is performed for a group of nozzles and that alignment may be extended (or cloned) to all the nozzles for that printhead.

In the pen axis alignment of a PWA printer, alignment may be performed by selecting which subset of nozzles from an array of available nozzles are chosen for printing, and as such the alignment may be considered to be a positional alignment. For example, there may be a plurality (e.g. 5120) individually addressable rows of nozzles (and of those rows there may be some nozzle overlap. Rather than the printing system using all the rows for printing an image, there may be a portion of unused nozzles (e.g. 40) to one or both sides of the printhead which form a nozzle buffer region of the printhead. In this way, there is a buffer region of e.g. 20 nozzles above and below the printing region ("active nozzle" region) of the printhead. To apply an alignment offset, the active nozzle region of the printhead may be shifted into the nozzle buffer region to change which nozzles are used to dispense printing fluid. For example, all the pens (printheads) may have a first (front) nozzle of nozzle number 20, but a misaligned pen maybe adjusted to start releasing printing fluid instead at nozzle number 25 (a positional shift in on direction) or number 15 (a positional shift in the opposite direction), so the image produced on the print medium is aligned. In such an alignment, it is each nozzle group (e.g. an individual trench, or all the trenches of the same colorant in a printhead) which are addressed and to which an offset is applied. A correction may be cloned to apply to another colorant in some examples. In such examples, rather than the correction per nozzle being stored for use in a subsequent alignment iteration, but the correction per nozzle group (e.g. correction per trench) is stored to move the complete image inside the trench.

Figure 5:
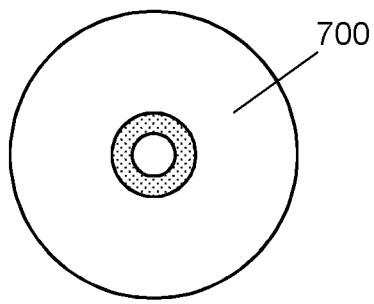
FIG. 5 illustrates a computer readable medium according to examples of the present disclosure.

FIG. 5 illustrates schematically a non-transitory computer-readable medium 700 comprising computer-readable instructions (i.e. computer code). Such code may be used to control the operation of a printing system 600 or a controller 602 of a printing system 600, for example according to any method disclosed herein. The machine readable storage 700 can be realised using any type or volatile or non-volatile (non-transitory) storage such as, for example, memory, a ROM, RAM, EEPROM, optical storage and the like.

Figure 6:
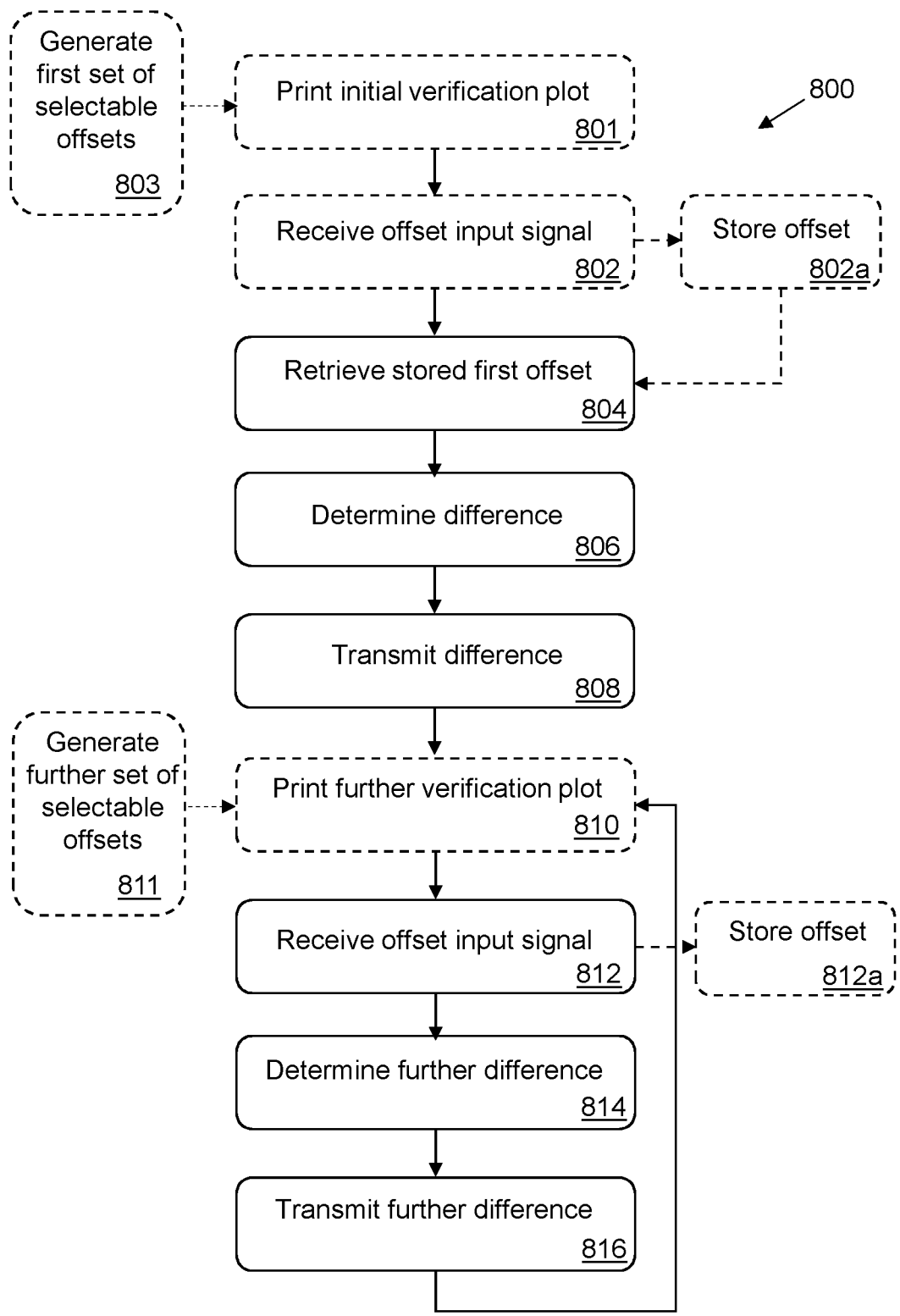
FIG. 6 shows an example alignment process performed by a processor of a computer device according to examples of the present disclosure.

In some examples, such instructions, when executed, may cause a processor 604 (or controller 602) of a computing device 600 to perform a method 800 as shown in FIG. 6. The processor 604 may be implemented, for example, by one or more discrete processing units (or data processing components) that are not limited to any particular hardware, firmware, or software (i.e., machine readable instructions) arrangement. The processor 604 may be implemented in any computing or data processing environment, such as in digital electronic circuitry, e.g., an application-specific integrated circuit, such as a digital signal processor (DSP) or in computer hardware, firmware, device driver, or software (i.e., machine readable instructions).

For example the instructions may, when executed by the processor 604, cause the processor 604 to: retrieve 804 a stored first offset to apply to a nozzle group of a printhead to align the printhead, wherein the first offset is determined according to a user input 802 to align the printhead. The instructions may cause the processor 604 to determine a difference for a printing fluid release controller of the nozzle group 806, based on the retrieved stored first offset 804 provided by the user input 802. The determined difference corresponds to the stored first offset to apply to the nozzle group. The instructions may cause the processor 604 to transmit the difference 808 to the printing fluid release controller of the nozzle group. The processor 604 may, in some examples, determine a first offset based on a first user input signal 802 provided to align the printhead, and may store 802a the determined first offset in a memory for later retrieval 804.

Following application of the first offset to the nozzle, the instructions may cause the processor 604 to receive an input signal 812 according to a further user input indicating a further offset to apply to the nozzle group. The further offset indicates a difference from the first offset (i.e. as an iterative adjustment) to apply to the nozzle group to align the printhead. The difference which is determined may be a time difference to adjust the timing of printing fluid release from a nozzle in some examples. The difference which is determined may be a positional difference to adjust the position of the nozzle array which is used to release printing fluid in some examples.

In some examples, there may be instructions that, when executed, cause the processor 604 of the computing device 600 to control the printhead to print a verification plot 801, 810 indicating a difference between a current position of the nozzle group (with no offset, a first offset, or a further offset applied, depending on the iteration of alignment procedure taking place), and an aligned position of the nozzle group. The first user input 802 may indicate, as the first offset, a possible offset selected from a plurality of possible offsets 803 displayed in the verification plot 801. Similarly, the further user input 812 may indicate, as the further offset, a possible offset selected from a plurality of possible offsets 811 displayed in the further verification plot 810. The processor 604 may determine the further offset 814 based on a received further user input signal 812, and may transmit the difference 816 to the printing fluid release controller of the nozzle group for printhead alignment according to the latest alignment offsets. In some examples the processor 604 may store 812a the determined further offset in a memory for subsequent retrieval in a next alignment iteration, for example. The term "control the printhead" as performed by a processor 602 is intended to include the processor 602 generating a control signal for controlling the printhead, and causing transmission of the control signal to a printhead for use by the printhead to operate in accordance with the control signal.

The verification plot 801, 810 may indicate a plurality of possible offsets to apply to the nozzle group. On a first pass, the printhead may be controlled to print an initial verification plot 801 which indicates the difference between a current position of the nozzle group which is a default start position without any user offset applied, and an aligned position of the nozzle group which is the ideal position being aimed for by applying the offsets. Following the first pass, the printhead may be controlled, following the application of one or more offsets to the nozzle group(s) which have been stored 802a, 812a, to print a further verification plot 810, which indicates the difference between a current position of the nozzle group, which is the position of the nozzle group with the latest input offset value applied, and the aligned position of the nozzle group. That is, there may be instructions that, when executed, cause the processor 604 of the computing device 600 to control the printhead to print a further verification plot 810 indicating a difference between a new current position of the nozzle group and an aligned position of the nozzle group. The new current position of the nozzle group corresponds to a position of the nozzle group with the latest input offset applied.

In some examples, there may be instructions that, when executed, cause the processor 604 of the computing device 600 to generate, for selection by a user, a set of selectable offsets corresponding to a nozzle group position within an allowable offset range 803. The processor 604 may receive the input signal 802 according to a user input indicating a first offset selected from the set of selectable offsets. Following receipt of the input signal 802, the instructions, when executed, may cause the processor 604 of the computing device 600 to generate 811, for selection by a user, a further set of selectable offsets based on the first offset. The further set of selectable offsets correspond to a nozzle group position within the allowable offset range with the first offset applied. The instructions may then cause the processor 604 of the computing device 600 to receive the further input signal 812 according to a user input indicating a further offset selected from the set of further selectable offsets 811. The further offset may then be stored 812a for a further alignment iteration if required.

Examples disclosed herein may thus be used to improve printhead alignment. When a printer printhead needs to be aligned, a verification plot may be printed which indicates the current position (in none or more print directions) of each printhead nozzle group (e.g. die, or trench) according to the last used/entered alignment values (offsets), as well as an indication of a further offset which the user may wish to use to align the printhead nozzles. The user can check the verification plot for any misalignments and enter their offset values to the printer. If the correctness of the alignment is to be checked, the verification plot can simply be printed again. This plot can be used to both align the printer in case it is not perfectly aligned, and check the current alignment of the printhead nozzles.

The verification plots disclosed herein may be used to align the printer in a similar way to traditional MPA plots, but also have a similar size and level of detail as traditional verification plots (i.e. less than in a traditional MPA plot) which were for indication of a current position and could not be used for making any adjustments. Thus, the verification plots disclosed herein may be printed more quickly and consume less media than a traditional MPA plot. Moreover, as the verification plot is printed with the last-used alignment values, rather than starting from a default position each time an alignment is to be performed, the verification plot patterns are well aligned if the printer alignment has not changed.

Examples disclosed herein may allow for using one plot type rather than methods generating separate MPA plots for alignment and verification plots for position checking. Furthermore, use is made of the last known alignment positions (the latest applied offset values) rather than reverting to a full alignment from scratch each time an adjustment is desired. Thus a faster alignment process is achievable that consumes less media. Moreover, as the same verification plot is used for both determining an adjustment to make and checking the current alignment, the alignment process has improved consistency as the possibility for variations to occur between generating different plot types for different purposes (MPA plot for adjustment determination and verification plot for checking current alignment) are removed.

Another effect arising from using the alignment procedures disclosed herein is that use is made of the previous alignment, making it easier for the user to directly check in a verification plot if the different printheads are still aligned, and not realigning all printheads/nozzle groups if one or more are already aligned; those which are to be better aligned may be adjusted as the last used alignment values (offsets) are retained.

Examples above can be realized in the form of hardware, programming or a combination of hardware and the software. Any such software, which may be machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. Such storage devices and storage media are examples of a tangible computer-readable storage medium that are suitable for storing a program or programs that, when executed, for example by a processor, implement examples disclosed herein.

In the foregoing description, numerous details are set forth to provide an understanding of the examples disclosed herein. However, some examples may be practiced without these details. While a limited number of examples are disclosed, numerous modifications and variations therefrom are contemplated. It is intended that the appended claims cover such modifications and variations and that the scope of protection is defined by the appended claims. Throughout the description and claims of this specification, the words "comprise" and "contain" and variations of them mean "including but not limited to", and they are not intended to (and do not) exclude other components, integers or elements. Throughout the description and claims of this specification, the singular encompasses the plural unless the context suggests otherwise. In particular, where the indefinite article is used, the specification is to be understood as contemplating plurality as well as singularity, unless the context suggests otherwise.

The following numbered paragraphs also form a part of this disclosure:

Paragraph 1. A computer-implemented method for a printing system comprising a printhead, the method comprising: retrieving a stored first offset applied to the printhead to align the printhead, the first offset determined based on a first user input signal; and further aligning the printhead according to a further offset determined based on a further user input signal, the further offset indicating a difference from the first offset.

Paragraph 2. The method of paragraph 1, comprising: providing a verification plot indicating a difference between a current position of the printhead and an aligned position of the printhead; wherein the further offset corresponds to an offset indicated in the verification plot.

Paragraph 3. The method of paragraph 1 or paragraph 2, comprising: determining the first offset based on the first user input signal provided to perform a first printhead alignment operation; and storing the determined first offset.

Paragraph 4. The method of any of paragraphs 1 to 3, comprising: providing an available range of offset values within upper and lower offset value bounds, wherein the first user input signal indicates the first offset within the available range; and providing a further available range of offset values within the upper and lower offset value bounds, wherein the further user input signal indicates the further offset within the further available range, and wherein the further available range of offset values is adjusted according to the first offset.

Paragraph 5. The method of any of paragraphs 1 to 4, wherein the first and further offsets correspond to one or more of: a difference between a current scan axis position of the printhead and an aligned scan axis position of the printhead; a difference between a current print medium axis position of the printhead and an aligned print medium axis position of the printhead; and a difference between a bidirectional scan axis position of the printhead and an aligned bidirectional scan axis position of the printhead.

Paragraph 6. A printing system comprising: a printhead comprising a plurality of nozzle groups, wherein a nozzle group comprises a plurality of individual nozzles; and a controller; wherein the controller is to: cause the printhead to generate a verification plot, the verification plot displaying: respective differences between a current position of each nozzle group and an aligned position of each nozzle group; and an indication of an offset to be applied to change the current position of each nozzle group to the aligned position of each nozzle group; receive an input signal indicating an offset to apply to each nozzle group, the input signal based on the verification plot; apply the indicated offset to each nozzle group according to the input signal to position each nozzle group at a corrected position; and cause the printhead to generate a further verification plot, the further verification plot displaying: respective differences between the corrected position of each nozzle group and the aligned position of each nozzle group; and an indication of an offset to be applied to change the corrected position of each nozzle group to the aligned position of each nozzle group.

Paragraph 7. The printing system of paragraph 6, wherein the verification plot and the further verification plot each display an indication of a plurality of possible offsets, and wherein the controller is to: receive the input signal indicating a selection of the offset to be applied to each nozzle group, the offset selected from the plurality of possible offsets; and apply the selected indicated offset to each nozzle group according to the input signal to move each nozzle group to the corrected position.

Paragraph 8. The printing system of paragraph 6 or paragraph 7, comprising a user interface module to: receive a user input indicating the offset to be applied from a range of possible offsets, the range of possible offsets determined based on the current position of each nozzle group and a range of allowable offsets, and provide the input signal to the controller based on the user input.

Paragraph 9. The printing system of any of paragraphs 6 to 8, comprising a memory to: based on receipt of the input signal indicating the offset to apply to each nozzle group, store the offset applied to each nozzle group; wherein the further verification plot is generated using the stored offset applied to each nozzle group to display the respective differences between the corrected position of each nozzle group and the aligned position of each nozzle group, the corrected position of each nozzle determined according to the stored offset applied to that nozzle group.

Paragraph 10. The printing system of any of paragraphs 6 to 9, wherein the controller is to apply the indicated offset to each nozzle group by: determining a time delay to apply to each nozzle group of the printhead to cause each nozzle group to release printing fluid at a time corresponding to the indicated offset for that nozzle group; or determining a positional shift to apply to the nozzle group to cause the nozzle group to move position into a nozzle buffer region of available nozzles located adjacent to the nozzle group.

Paragraph 11. A non-transitory computer-readable medium comprising instructions that, when executed, cause a processor of a computing device to: retrieve a stored first offset to apply to a nozzle group of a printhead to align the printhead, wherein the first offset is determined according to a user input to align the printhead; determine a difference for a printing fluid release controller of the nozzle group, the determined difference corresponding to the stored first offset to apply to the nozzle group; transmit the difference to the printing fluid release controller of the nozzle group; and receive an input signal according to a further user input indicating a further offset to apply to the nozzle group, wherein the further offset indicates a difference from the first offset to apply to the nozzle group to align the printhead.

Paragraph 12. The non-transitory computer-readable medium of paragraph 11, comprising instructions that, when executed, cause a processor of a computing device to: control the printhead to print a verification plot indicating a difference between a current position of the nozzle group with the first offset applied and an aligned position of the nozzle group, wherein the further user input indicates, as the further offset, a possible offset selected from a plurality of possible offsets displayed in the verification plot.

Paragraph 13. The non-transitory computer-readable medium of paragraph 11 or paragraph 12, comprising instructions that, when executed, cause the processor of the computing device to: determine the first offset based on the first user input signal provided to align the printhead; and store the determined first offset in a memory.

Paragraph 14. The non-transitory computer-readable medium of any of paragraphs 11 to 13, comprising instructions that, when executed, cause a processor of a computing device to: generate, for selection by a user, a set of selectable offsets corresponding to a nozzle group position within an allowable offset range; and receive the input signal according to the further user input indicating the further offset selected from the set of selectable offsets.

Paragraph 15. The non-transitory computer-readable medium of any of paragraphs 11 to 14, comprising instructions that, when executed, cause the processor of the computing device to, following receipt of the input signal: determine the further offset based on the received further user input signal; and store the determined further offset in a memory.

The invention claimed is:

1. A computer-implemented method for a printing system comprising a printhead, the method comprising:
retrieving a stored first offset applied to the printhead to align the printhead, the stored first offset determined based on a first user input signal; and
further aligning the printhead according to a further offset determined based on a further user input signal, the further offset indicating a difference from the first offset.

2. The method of claim 1, comprising:
providing a verification plot indicating a difference between a current position of the printhead and an aligned position of the printhead; wherein the further offset corresponds to an offset indicated in the verification plot.

3. The method of claim 1, comprising:
determining the first offset based on the first user input signal provided to perform a first printhead alignment operation; and
storing the determined first offset.

4. The method of claim 1, comprising:
providing an available range of offset values within upper and lower offset value bounds, wherein the first user input signal indicates the first offset within the available range; and
providing a further available range of offset values within the upper and lower offset value bounds, wherein the further user input signal indicates the further offset within the further available range, and wherein the further available range of offset values is adjusted according to the first offset.

5. The method of claim 1, wherein the first and further offsets correspond to one or more of:
a difference between a current scan axis position of the printhead and an aligned scan axis position of the printhead;
a difference between a current print medium axis position of the printhead and an aligned print medium axis position of the printhead; and
a difference between a bidirectional scan axis position of the printhead and an aligned bidirectional scan axis position of the printhead.

6. A printing system comprising:
a printhead comprising a plurality of nozzle groups, wherein a nozzle group comprises a plurality of individual nozzles; and
a controller; wherein the controller is to:
cause the printhead to generate a verification plot, the verification plot displaying:
respective differences between a current position of each nozzle group and an aligned position of each nozzle group; and
an indication of an offset to be applied to change the current position of each nozzle group to the aligned position of each nozzle group;
receive an input signal indicating an offset to apply to each nozzle group, the input signal based on the verification plot;
apply the indicated offset to each nozzle group according to the input signal to position each nozzle group at a corrected position; and
cause the printhead to generate a further verification plot, the further verification plot displaying:
respective differences between the corrected position of each nozzle group and the aligned position of each nozzle group; and
an indication of an offset to be applied to change the corrected position of each nozzle group to the aligned position of each nozzle group.

7. The printing system of claim 6, wherein the verification plot and the further verification plot each display an indication of a plurality of possible offsets, and wherein the controller is to:
receive the input signal indicating a selection of the offset to be applied to each nozzle group, the offset selected from the plurality of possible offsets; and
apply the selected indicated offset to each nozzle group according to the input signal to move each nozzle group to the corrected position.

8. The printing system of claim 6, comprising a user interface module to:
receive a user input indicating the offset to be applied from a range of possible offsets, the range of possible offsets determined based on the current position of each nozzle group and a range of allowable offsets, and provide the input signal to the controller based on the user input.

9. The printing system of claim 6, comprising a memory to:
based on receipt of the input signal indicating the offset to apply to each nozzle group, store the offset applied to each nozzle group;
wherein the further verification plot is generated using the stored offset applied to each nozzle group to display the respective differences between the corrected position of each nozzle group and the aligned position of each nozzle group, the corrected position of each nozzle group determined according to the stored offset applied to that nozzle group.

10. The printing system of claim 6, wherein the controller is to apply the indicated offset to each nozzle group by:
determining a time delay to apply to each nozzle group of the printhead to cause each nozzle group to release printing fluid at a time corresponding to the indicated offset for that nozzle group; or
determining a positional shift to apply to the nozzle group to cause the nozzle group to move position into a nozzle buffer region of available nozzles located adjacent to the nozzle group.

11. A non-transitory computer-readable medium comprising instructions that, when executed, cause a processor of a computing device to:
retrieve a stored first offset to apply to a nozzle group of a printhead to align the printhead, wherein the stored first offset is determined according to a user input to align the printhead;
determine a difference for a printing fluid release controller of the nozzle group, the determined difference corresponding to the stored first offset to apply to the nozzle group;
transmit the difference to the printing fluid release controller of the nozzle group; and
receive an input signal according to a further user input indicating a further offset to apply to the nozzle group, wherein the further offset indicates a difference from the first offset to apply to the nozzle group to align the printhead.

12. The non-transitory computer-readable medium of claim 11, comprising instructions that, when executed, cause a processor of a computing device to:

control the printhead to print a verification plot indicating a difference between a current position of the nozzle group with the first offset applied, and an aligned position of the nozzle group, wherein the further user input indicates, as the further offset, a possible offset selected from a plurality of possible offsets displayed in the verification plot.

13. The non-transitory computer-readable medium of claim 11, comprising instructions that, when executed, cause the processor of the computing device to:

determine the first offset based on the first user input signal provided to align the printhead; and store the determined first offset in a memory.

14. The non-transitory computer-readable medium of claim 11, comprising instructions that, when executed, cause a processor of a computing device to:

generate, for selection by a user, a set of selectable offsets corresponding to a nozzle group position within an allowable offset range; and receive the input signal according to the further user input indicating the further offset selected from the set of selectable offsets.

15. The non-transitory computer-readable medium of claim 14, comprising instructions that, when executed, cause the processor of the computing device to, following receipt of the input signal:

determine the further offset based on the received further user input signal; and store the determined further offset in a memory.

* * * * *